United States Patent
Macdonald (10) Patent No.: US 12,527,310 B2
(45) Date of Patent: Jan. 20, 2026

(54) STRAP FOR EQUINE HOOF BOOT AND BOOT

(71) Applicant: Scootboot Pty Ltd, Tasmania (AU)

(72) Inventor: David Duncan Macdonald, Tasmania (AU)

(73) Assignee: Scootboot Pty Ltd, Tasmania (AU)

( * ) Notice: Subject to any disclaimer, the term of this patent is extended or adjusted under 35 U.S.C. 154(b) by 27 days.

(21) Appl. No.: 17/262,486

(22) PCT Filed: Jul. 22, 2019

(86) PCT No.: PCT/AU2019/050761
§ 371 (c)(1),
(2) Date: Jan. 22, 2021

(87) PCT Pub. No.: WO2020/019018
PCT Pub. Date: Jan. 30, 2020

(65) Prior Publication Data
US 2021/0289764 A1    Sep. 23, 2021

(30) Foreign Application Priority Data

Jul. 23, 2018  (AU) .............................. 2018902662
Nov. 29, 2018  (AU) .............................. 2018904555

(51) Int. Cl.
*A01L 3/06*    (2006.01)
*A01K 13/00*   (2006.01)

(52) U.S. Cl.
CPC .............. *A01L 3/06* (2013.01); *A01K 13/007* (2013.01)

(58) Field of Classification Search
CPC ..... A01L 3/06; A01L 3/00; A01L 5/00; A01L 7/00; A01L 9/00; A01K 13/006–007;
(Continued)

(56) References Cited

U.S. PATENT DOCUMENTS 28,218 A * 5/1860 Valkenburgh ............. A01L 3/06
                                                    168/5
56,477 A * 7/1866 Wilkinson ................ A01L 3/00
                                                    40/1.5
(Continued)

FOREIGN PATENT DOCUMENTS

AT     010503 U1 *  5/2009
AT     519083 A1 *  3/2018  ........... A01K 13/007
(Continued)

OTHER PUBLICATIONS

EP 1738641 A1 machine translation (Year: 2007).*
(Continued)

*Primary Examiner* — Son T Nguyen
(74) *Attorney, Agent, or Firm* — David D. Brush; Westman, Champlin & Koehler, P.A.

(57) ABSTRACT

A securing strap for an equine hoof boot. The strap is configured for securing the boot to a hoof of a horse at a location above the horse's coronary band and for fixing to the boot at generally central locations on a front and rear of the boot. The strap includes: a centrally positioned coupler above a front of the boot; and first and second sections. Each of the first and second sections is configured to extend on either side of the horse's pastern bone to come together at a location above the horse's coronary band at the centrally positioned coupler. The coupler includes an adjustable sleeve through which respective ends of the first and second sections are fed and drawn tight around the hoof.

17 Claims, 6 Drawing Sheets

(58) Field of Classification Search
CPC ........... A43C 11/12; A43C 11/14; A42B 3/08; A44B 11/2549
USPC ............... 168/1, 3; 24/302; 2/421, 425, 417; 36/58.5
See application file for complete search history.

(56) References Cited

U.S. PATENT DOCUMENTS

| | | | |
|---|---|---|---|
| 57,029 A * | 8/1866 | Wilkinson | A01L 3/00 168/18 |
| 65,231 A | 5/1867 | Jennings | |
| 70,035 A * | 10/1867 | Sloat | A01L 3/00 168/18 |
| 70,274 A * | 10/1867 | Schreiner | A01L 3/00 168/22 |
| 72,594 A * | 12/1867 | Bishops | A01L 3/00 403/345 |
| 79,128 A * | 6/1868 | Jones | A01K 13/007 54/82 |
| 96,104 A | 10/1869 | Haedrich | |
| 119,906 A * | 10/1871 | Williams | A01K 13/007 54/82 |
| 124,215 A * | 3/1872 | Moran et al. | A01L 3/00 168/18 |
| 149,930 A | 4/1874 | Higgins | |
| 164,174 A * | 6/1875 | Jacobs | A01L 3/06 168/18 |
| 167,895 A * | 9/1875 | Hall | A01K 13/007 54/82 |
| 177,991 A | 5/1876 | Cook | |
| 180,295 A * | 7/1876 | White | A01K 13/007 54/82 |
| 181,750 A * | 8/1876 | Webber | A01K 13/007 54/82 |
| 217,582 A * | 7/1879 | Campbell | A01L 3/00 168/18 |
| 231,953 A * | 9/1880 | Campbell | A01L 3/00 168/18 |
| 267,855 A | 11/1882 | Fenley | |
| 285,552 A * | 9/1883 | Barnard | A01K 13/007 54/82 |
| 286,319 A * | 10/1883 | Lightford et al. | A01K 13/007 54/82 |
| 288,220 A * | 11/1883 | Fennell | A01K 13/007 54/82 |
| 288,836 A * | 11/1883 | Miller | A01L 3/00 168/18 |
| 330,241 A * | 11/1885 | Keagle | A01K 13/007 168/2 |
| 338,166 A * | 3/1886 | Dumke | A01L 3/06 168/3 |
| 339,050 A * | 3/1886 | Drew | A01K 13/007 54/82 |
| 342,790 A * | 6/1886 | Fenton | A01K 13/007 54/82 |
| 349,668 A | 9/1886 | St. John | |
| 367,271 A * | 7/1887 | Coolidge | A01K 13/007 24/484 |
| 381,388 A | 4/1888 | Kinsey | |
| 392,291 A * | 11/1888 | Schild | A01K 13/007 54/82 |
| 440,048 A | 11/1890 | Mayow | |
| 448,312 A | 3/1891 | Barclay | |
| 476,517 A * | 6/1892 | Clark et al. | A01K 13/007 54/82 |
| 519,047 A * | 5/1894 | Rogers | A01K 13/007 54/82 |
| 519,822 A * | 5/1894 | Sidebotham | A01K 13/007 168/19 |
| D26,832 S | 3/1897 | Hirsch | |
| 601,541 A | 3/1898 | Anderson | |
| 617,153 A * | 1/1899 | Galpin | A01K 13/007 54/82 |
| 625,810 A | 5/1899 | Shappell | |
| 630,310 A | 8/1899 | Agnew | |
| 661,424 A | 11/1900 | Pflueger | |
| 697,791 A | 4/1902 | Boumal | |
| 708,983 A | 9/1902 | Bartlet | |
| 719,687 A | 2/1903 | Nickerson | |
| 759,636 A | 5/1904 | Ryan | |
| 777,348 A * | 12/1904 | Luther | A01K 13/007 54/82 |
| 797,895 A | 8/1905 | Johnson | |
| 798,598 A * | 9/1905 | Conn | A01L 3/00 168/18 |
| 840,892 A | 1/1907 | Adam | |
| 918,556 A | 4/1909 | Kalm | |
| 1,035,537 A * | 8/1912 | Cook | A01L 3/00 168/18 |
| 1,036,750 A | 8/1912 | Tuttle | |
| 1,039,002 A | 9/1912 | Winston | |
| 1,054,563 A | 2/1913 | Kiso | |
| 1,096,912 A | 5/1914 | Herman | |
| 1,129,683 A | 2/1915 | Jaffie | |
| 1,211,268 A | 1/1917 | Zadina | |
| 1,218,901 A | 3/1917 | Saxton | |
| 1,270,207 A | 6/1918 | Preston | |
| 1,274,483 A | 8/1918 | Wiesenberg | |
| 1,294,896 A | 2/1919 | Grant | |
| 1,298,364 A | 3/1919 | McCoy | |
| 1,328,708 A | 1/1920 | Blondeau | |
| 1,879,991 A | 9/1932 | Pratt | |
| 2,064,566 A | 12/1936 | Richman | |
| 2,535,394 A | 12/1950 | Davis | |
| 2,572,889 A | 10/1951 | Strykower | |
| 2,619,744 A | 12/1952 | Mattes | |
| 2,886,935 A * | 5/1959 | Shelton | A01K 13/007 54/82 |
| 3,286,441 A * | 11/1966 | Eanes | A01K 13/007 54/82 |
| 3,364,500 A | 1/1968 | Fox | |
| 3,439,670 A | 4/1969 | Schuerch | |
| 3,703,209 A * | 11/1972 | Glass | A01L 5/00 168/DIG. 1 |
| 3,732,929 A * | 5/1973 | Glass | A01K 13/007 54/82 |
| 3,794,119 A | 2/1974 | Paiso et al. | |
| 3,867,905 A | 2/1975 | Vail, Jr. | |
| 3,967,683 A | 7/1976 | Ensinozo | |
| 4,019,463 A | 4/1977 | Kitchen | |
| 4,174,754 A * | 11/1979 | Glass | A01K 13/007 168/18 |
| 4,185,695 A | 1/1980 | Hancock | A01L 5/00 168/26 |
| 4,189,004 A | 2/1980 | Glass | |
| 4,212,356 A * | 7/1980 | Battle | A01L 5/00 168/18 |
| 4,265,314 A * | 5/1981 | Tovim | A01L 5/00 168/4 |
| 4,346,762 A | 8/1982 | Tovim | |
| 4,444,269 A * | 4/1984 | Laurent | A01K 13/007 54/82 |
| 4,470,411 A * | 9/1984 | Hoyt, Jr. | A01K 13/007 54/82 |
| 4,665,590 A * | 5/1987 | Udelhofen | F16G 11/106 24/30.5 R |
| D293,043 S | 12/1987 | Zamboni | |
| 4,736,800 A * | 4/1988 | Rohner | A01L 3/00 54/82 |
| D295,907 S | 5/1988 | Decker | |
| 4,744,422 A | 5/1988 | Dallmer | |
| D309,619 S * | 7/1990 | Kalbach | D16/339 |
| 4,981,010 A * | 1/1991 | Orza | A01K 13/007 54/82 |
| 5,148,872 A | 9/1992 | Dallmer | |
| 5,174,382 A * | 12/1992 | Wright | A01L 9/00 168/28 |
| 5,209,048 A * | 5/1993 | Hanson | A01K 13/007 54/82 |
| D343,291 S | 1/1994 | Langford | |
| 5,282,825 A | 2/1994 | Muck et al. | |

(56) References Cited

U.S. PATENT DOCUMENTS

| | | | |
|---|---|---|---|
| 5,345,656 A * | 9/1994 | Merritt | F16G 11/14 24/132 WL |
| D354,760 S | 1/1995 | Wolff | |
| 5,481,888 A | 1/1996 | Perry | |
| 5,511,756 A | 4/1996 | Spradling | |
| 5,528,885 A | 6/1996 | Chamberlain | |
| 5,600,901 A | 2/1997 | Leonor | |
| 5,608,918 A * | 3/1997 | Salvaggio | A44B 11/02 24/169 |
| D382,503 S | 8/1997 | Kalbach | |
| 5,715,661 A * | 2/1998 | Meyers | A01K 13/007 54/82 |
| D410,336 S | 6/1999 | Frisoni | |
| 6,056,173 A | 5/2000 | Gillespie | |
| 6,058,578 A | 5/2000 | Lan | |
| 6,192,989 B1 * | 2/2001 | Tooman | A01K 13/007 54/82 |
| 6,305,328 B1 * | 10/2001 | Marquis | A01L 3/06 36/111 |
| 6,560,951 B1 * | 5/2003 | Wood | A01K 13/007 54/82 |
| 6,619,238 B1 | 9/2003 | Amato | |
| 6,662,537 B1 * | 12/2003 | Wilson | A01K 13/007 54/82 |
| 6,694,713 B1 * | 2/2004 | MacDonald | A01K 13/007 54/82 |
| D505,259 S | 5/2005 | Heatherwick | |
| 6,941,619 B2 * | 9/2005 | Mackay | G02C 3/003 24/302 |
| 7,032,367 B1 * | 4/2006 | Yoho | A01K 13/007 54/82 |
| D543,697 S | 6/2007 | Heatherwick | |
| D557,008 S | 12/2007 | Stiller | |
| 7,302,788 B1 * | 12/2007 | Chang | A01K 13/007 54/82 |
| D568,148 S | 5/2008 | Tamura et al. | |
| 7,445,051 B2 | 11/2008 | Ruetenik | |
| D597,824 S | 8/2009 | Wang | |
| 7,578,115 B2 | 8/2009 | Ford et al. | |
| D614,018 S | 4/2010 | Mcclanahan et al. | |
| D615,253 S | 5/2010 | Goodell | |
| D629,290 S | 12/2010 | Stevens et al. | |
| D638,330 S | 5/2011 | Fahrendorff et al. | |
| 8,151,545 B1 | 4/2012 | Ford | |
| D662,436 S | 6/2012 | Kalbach | |
| 8,245,418 B2 | 8/2012 | Paintin et al. | |
| D667,749 S | 9/2012 | Case et al. | |
| D677,842 S | 3/2013 | Kalbach | |
| D679,218 S | 4/2013 | Kalbach | |
| 8,413,412 B2 | 4/2013 | Ford | |
| D695,976 S | 12/2013 | Allen, Jr. | |
| D699,144 S | 2/2014 | Kalbach | |
| D711,602 S | 8/2014 | Driver | |
| 8,931,244 B2 | 1/2015 | Gola | |
| D743,691 S | 11/2015 | Romano | |
| D765,413 S | 9/2016 | Derr | |
| D770,170 S | 11/2016 | Akana et al. | |
| 9,538,738 B2 | 1/2017 | Bergeleen et al. | |
| 9,704,368 B2 | 7/2017 | Dehart | |
| D793,075 S | 8/2017 | Ma et al. | |
| D796,124 S | 8/2017 | Ying | |
| D851,920 S | 6/2019 | Mouriz | |
| 10,306,972 B2 | 6/2019 | Mendez et al. | |
| 10,330,173 B1 | 6/2019 | Mckye et al. | |
| D854,916 S | 7/2019 | Derr | |
| D880,148 S | 4/2020 | Akana et al. | |
| D899,710 S | 10/2020 | MacDonald | |
| D950,699 S * | 5/2022 | Buckley | D23/366 |
| 2003/0037416 A1 * | 2/2003 | Buettell | G09F 21/02 24/122.6 |
| 2003/0070403 A1 * | 4/2003 | Osha | A01L 15/00 54/82 |
| 2004/0065063 A1 * | 4/2004 | Osha | A01L 7/02 54/82 |
| 2005/0066632 A1 * | 3/2005 | Ford | A01K 13/007 54/82 |
| 2005/0092260 A1 * | 5/2005 | Paxton | A01K 13/007 119/850 |
| 2005/0150197 A1 * | 7/2005 | Ford | A01K 13/007 54/82 |
| 2006/0064950 A1 * | 3/2006 | Ford | A01K 13/007 54/82 |
| 2006/0162296 A1 * | 7/2006 | Maestrini | A01K 13/007 54/82 |
| 2007/0000105 A1 * | 1/2007 | Grande | F16G 11/101 24/712.5 |
| 2007/0039565 A1 * | 2/2007 | Krottinger | A01K 13/007 119/850 |
| 2007/0068125 A1 * | 3/2007 | Davis | A01L 15/00 54/82 |
| 2007/0084020 A1 | 4/2007 | Chui et al. | |
| 2007/0113524 A1 * | 5/2007 | Lander | A01K 13/007 54/82 |
| 2007/0121987 A1 | 5/2007 | Fielding, Jr. | |
| 2008/0083198 A1 * | 4/2008 | Wilson | A01K 13/007 54/82 |
| 2008/0083542 A1 * | 4/2008 | Ford | A01L 3/06 54/82 |
| 2008/0264005 A1 * | 10/2008 | Ford | A01L 3/00 54/82 |
| 2009/0032270 A1 * | 2/2009 | Ruetenik | A01L 7/02 168/28 |
| 2009/0071109 A1 * | 3/2009 | Ford | A01K 13/007 54/82 |
| 2009/0100808 A1 * | 4/2009 | Ford | A01K 13/007 54/82 |
| 2009/0120980 A1 | 5/2009 | Calayo | |
| 2010/0114155 A1 * | 5/2010 | Siani | A01L 3/06 606/212 |
| 2010/0229508 A1 * | 9/2010 | Gola | A01K 13/007 54/82 |
| 2010/0287791 A1 * | 11/2010 | Liu | A43C 7/00 36/50.1 |
| 2011/0000173 A1 | 1/2011 | Lander | |
| 2011/0197554 A1 * | 8/2011 | Ruetenik | A01K 13/007 54/82 |
| 2012/0005995 A1 * | 1/2012 | Emery | A01K 13/007 54/82 |
| 2012/0018175 A1 * | 1/2012 | Revheim | A01K 13/007 168/17 |
| 2012/0227364 A1 * | 9/2012 | Ford | A01K 13/007 54/82 |
| 2013/0008139 A1 | 1/2013 | Lander | |
| 2013/0014960 A1 | 1/2013 | Palmer et al. | |
| 2013/0019575 A1 | 1/2013 | Bartlett | |
| 2013/0105180 A1 | 5/2013 | Valer Fuentes | |
| 2013/0112437 A1 | 5/2013 | Sledd et al. | |
| 2014/0007548 A1 * | 1/2014 | Revheim | A01L 7/02 54/82 |
| 2014/0116733 A1 * | 5/2014 | Finnegan | D03D 51/34 168/18 |
| 2014/0144109 A1 * | 5/2014 | Burr | A01K 13/007 54/82 |
| 2014/0166006 A1 | 6/2014 | Meier | |
| 2014/0231100 A1 | 8/2014 | Ford | |
| 2014/0251642 A1 * | 9/2014 | Revheim | A01L 3/00 168/18 |
| 2014/0331944 A1 | 11/2014 | Chirico | |
| 2014/0367124 A1 | 12/2014 | Moller et al. | |
| 2014/0374124 A1 | 12/2014 | Mahidhara | |
| 2015/0060089 A1 | 3/2015 | Kunkle | |
| 2015/0101833 A1 * | 4/2015 | Ford | A01L 3/00 168/26 |
| 2015/0152942 A1 | 6/2015 | Kindstrand et al. | |
| 2015/0238344 A1 * | 8/2015 | Nylund | A61F 5/0111 602/27 |
| 2015/0366181 A1 | 12/2015 | Koenig et al. | |
| 2016/0029609 A1 * | 2/2016 | Macdonald | A01K 13/007 168/18 |
| 2016/0227739 A1 * | 8/2016 | Yang | A01K 13/007 |
| 2016/0324136 A1 | 11/2016 | Silanus et al. | |

(56) References Cited

U.S. PATENT DOCUMENTS

| | | | | |
|---|---|---|---|---|
| 2017/0172134 | A1* | 6/2017 | Ruetenik | B68B 7/00 |
| 2017/0208791 | A1* | 7/2017 | Eberle | A01K 13/007 |
| 2018/0042210 | A1* | 2/2018 | Edwards | A01L 1/02 |
| 2019/0364848 | A1* | 12/2019 | Ford | A01K 13/007 |
| 2020/0178502 | A1* | 6/2020 | Macdonald | A01K 13/007 |
| 2021/0219534 | A1 | 7/2021 | Pereira Suarez et al. | |
| 2022/0333668 | A1* | 10/2022 | Piao | A44B 11/26 |
| 2024/0225199 | A1* | 7/2024 | Perrier | A43C 11/12 |

FOREIGN PATENT DOCUMENTS

| | | | | |
|---|---|---|---|---|
| AT | 519658 | B1 * | 9/2018 | A01K 13/007 |
| AU | 2006100740 | A4 * | 10/2006 | A01K 13/007 |
| AU | 2013200509 | A1 | 2/2013 | |
| AU | 2014231767 | A1 | 9/2014 | |
| BE | 1015985 | A6 * | 12/2005 | A01K 13/007 |
| BR | 8307232 | A | 8/1985 | |
| CA | 2824535 | A1 | 7/2012 | |
| CN | 102811609 | A | 12/2012 | |
| CN | 103385228 | A | 11/2013 | |
| CN | 204206956 | U | 3/2015 | |
| CN | 204206957 | U | 3/2015 | |
| DE | 155659 | C | 7/1902 | |
| EP | 1210873 | A2 | 6/2002 | |
| EP | 1738641 | A1 * | 1/2007 | A01K 13/007 |
| EP | 2409565 | A1 | 1/2012 | |
| ES | 1072993 | U | 10/2010 | |
| GB | 2128867 | A | 5/1984 | |
| GB | 2338394 | A | 12/1999 | |
| GB | 2492266 | B | 5/2014 | |
| GB | 2517176 | A | 2/2015 | |
| IE | 886373 | B2 | 4/2014 | |
| IN | 2317DEN2015 | | 8/2015 | |
| WO | 03015509 | A1 | 2/2003 | |
| WO | WO-2004047526 | A1 * | 6/2004 | A01K 13/007 |
| WO | WO-2004064668 | A2 * | 8/2004 | A01K 13/007 |
| WO | WO-2004071226 | A2 * | 8/2004 | A01K 13/007 |
| WO | WO-2006001764 | A1 * | 1/2006 | A01K 13/007 |
| WO | 2008025065 | A1 | 3/2008 | |
| WO | WO-2009050750 | A1 * | 4/2009 | A01K 13/007 |
| WO | WO-2009120085 | A1 * | 10/2009 | A01K 13/007 |
| WO | WO-2012039627 | A1 * | 3/2012 | A01K 13/007 |
| WO | 2014046634 | A1 | 3/2014 | |
| WO | WO-2014138790 | A1 * | 9/2014 | A01K 13/007 |
| WO | 2014166006 | A1 | 10/2014 | |
| WO | 2014176705 | A1 | 11/2014 | |
| WO | WO-2015006818 | A1 * | 1/2015 | A01K 13/007 |
| WO | 2015026253 | A1 | 2/2015 | |
| WO | 2015069307 | A1 | 5/2015 | |
| WO | 2015157817 | A1 | 10/2015 | |
| WO | 2015186036 | A1 | 10/2015 | |
| WO | 2015172211 | A1 | 11/2015 | |
| WO | 2018033650 | A1 | 2/2018 | |
| WO | 2018218307 | A1 | 12/2018 | |
| WO | 2020019018 | A1 | 1/2020 | |

OTHER PUBLICATIONS

Hufcheck—Floating Boots Model Traiuner 2014—English Version, 5 Screenshots, YouTube, (Jan. 20, 2015), URL: https://youtu.be/9Not4c_jpgc, [viewed on the Internet on Jan. 3, 2019].

International Search Report dated Sep. 13, 2019 for corresponding International Application No. PCT/AU2019/050761, Jul. 22, 2019.

Written Opinion of the International Searching Authority dated Sep. 13, 2019 for corresponding International Application No. PCT/AU2019/050761, filed Jul. 22, 2019.

International Search Report dated Apr. 11, 2014 for corresponding International Patent Application PCT/AU2013/000249, filed Mar. 13, 2014.

Written Opinion of the International Searching Authority dated Sep. 15, 2015 for corresponding International Patent Application PCT/AU2013/000249, filed Mar. 13, 2014.

Partial European Search Report dated Oct. 13, 2016 for corresponding European Application No. 14765745.

Espacenet search results on Apr. 20, 2016 10:55—Shoe of hoof or hooves or feet or hose or equine or retain or secure or lock or bulb in teh title or abstract AND A01L1/low or A0L 13/low as the IPC classification.

Notice of Allowance dated Jul. 22, 2020 for corresponding U.S. Appl. No. 29/677,621, filed Jan. 22, 2019.

Office Action dated Oct. 24, 2017 for corresponding U.S. Appl. No. 14/777,201, filed Sep. 15, 2015.

Final Office Action dated Jul. 5, 2018 for corresponding U.S. Appl. No. 14/777,201, filed Sep. 15, 2015.

Office Action dated Dec. 13, 2018 for corresponding U.S. Appl. No. 14/777,201, filed Sep. 15, 2015.

Final Office Action dated May 15, 2019 for corresponding U.S. Appl. No. 14/777,201, filed Sep. 15, 2015.

Office Action dated Nov. 4, 2019 for corresponding U.S. Appl. No. 14/777,201, filed Sep. 15, 2015.

Final Office Action dated Apr. 8, 2020 for corresponding U.S. Appl. No. 14/777,201, filed Sep. 15, 2015.

Notice of Allowance dated Oct. 15, 2020 for corresponding U.S. Appl. No. 14/777,201, filed Sep. 15, 2015.

Australian Examination Report for AU Application No. 2019268145, dated Nov. 17, 2020.

International Preliminary Report on Patentability Dated Aug. 25, 2021 From the International Preliminary Examining Authority Re. Application No. PCT/AU2021/050358. (15 Pages).

International Searh Report and the Written Opinion Dated Jun. 25, 2021 From the International Searching Authority Re. Application No. PCT/AU2021/050358. (9 Pages).

U.S. Patent Office issued prosecution for U.S. Appl. No. 17/920,043, filed Oct. 20, 2022, including: Non-Final Rejection issued May 2, 2025, 18 pages; Advisory Action issued Apr. 10, 2025, 3 pages; Final Rejection issued Jan. 2, 2025, 13 pages; Non-Final Rejection issued Sep. 25, 2024, 12 pages; Non-Final Rejection issued Mar. 4, 2024, 12 pages; 58 pages total.

Notice of Allowance and Fee(s) Due for U.S. Appl. No. 17/920,043, mailed Aug. 21, 2025, 8 pages.

* cited by examiner

STRAP FOR EQUINE HOOF BOOT AND BOOT

CROSS-REFERENCE TO RELATED APPLICATION

The present application is a Section 371 National Stage Application of International Application No. PCT/AU2019/050761, filed Jul. 22, 2019, which is incorporated by reference in its entirety and published as WO 2020/019018 A1 on Jan. 30, 2020, in English.

FIELD OF THE INVENTION

The present invention relates to a strap for an equine hoof boot and a hoof boot including such a strap.

BACKGROUND

The problems associated with using metal horseshoes are well known though they continue to be used by some. Numerous hoof boots have previously been proposed with varying degrees of success. A good discussion of the prior art can be found in PCT/AU2014/000249, also to the present applicant, who has come up with methods to improve upon prior hoof boots.

A common problem with prior art hoof boots is that they can be dislodged from the hoof, particularly when traversing deep mud that sucks the boot from the hoof during withdrawal. Losing a hoof boot can be hazardous to the horse as it can leave their hoof vulnerable to damage, and frustrating as it can impede the task the horse was undertaking when it lost the boot. Losing a hoof boot can also be expensive if lost boots cannot be retrieved.

There is a need to address the above, and/or at least provide a useful alternative.

SUMMARY

There is provided a securing strap for an equine hoof boot, the strap being configured for securing the boot to the hoof at a location above a horses coronary band and for fixing to the boot at generally central locations on the front and rear of the boot, wherein the strap has two sections, each section extending either side of the horses pastern bone, the two sections coming together at a location above the horses coronary band for securement to the hoof.

According to preferred embodiments, the coupler is centrally positioned above the front of the boot. Preferably, the two sections come together at a location between the coronary band and approximately 40 mm above the coronary band. Preferably, the two sections extend through the coupler for fixing to a front of the boot near the sole.

The front of the boot can include a slit and have at least one fastening strap for closing the slit, the two sections being securable to the fastening strap. Preferably, the boot comprises two fastening straps, the two sections being secured to lower one of the fastening straps.

The coupler can be an adjustable sleeve or lock. Preferably, the strap is configured for extending through apertures formed in a rearward part of the boot to secure the strap to the rearward part of the boot.

The coupler can be configured to engage the boot at a lower portion thereof to keep it in position.

There is also provided an equine boot comprising:
a sole member for receiving against a bottom of a hoof;
an upper having a ventral portion at a front of the boot and a dorsal portion at a rear of the boot, in use an inside of the ventral portion is contactable with a toe of the hoof and an inside of the dorsal portion is contactable with a rear of the hoof, the dorsal portion including bulb-engaging means for engaging peripheries of bulbs of the hoof so as to impede rotation of the boot relative to the hoof; and
a securing strap of the above described type, the strap extending between the ventral and dorsal positions to secure the boot to the hoof.

In some embodiments, the dorsal portion takes a substantially 'm' shaped configuration and the securing strap engages an upper central part of the 'm'.

The securing strap preferably extends around a generally vertical part of the 'm', through openings formed in the bulb engaging means.

The ventral portion can have an opening extending therethrough to a level of the interior of the sole member so as to allow the ventral portion to be spread open for application of the boot to the hoof. The opening can comprise a substantially vertical slit. The boot can further comprise a lateral opening extending through a lower end of the upper which opens up to the level of the interior of the sole member.

The vertical slit and the lateral opening can together define an upside down t-shaped opening in the ventral portion. The bulb-engaging means can include a cleft-engaging member for engaging a cleft of the bulbs of the hoof. Preferably, the cleft-engaging member includes a shank or web which engages the cleft of the bulbs. Preferably, the shank or web is generally half round in cross section, the rounded surface of the shank or web being directed towards the cleft when the boot is worn.

The bulb-engaging means can comprise apertures through which respective bulbs of the hoof can protrude when the boot is worn. Preferably, the apertures extend to the level of the interior of the sole member.

BRIEF DESCRIPTION OF THE DRAWINGS

In order that the invention may be more easily understood, an embodiment will now be described, by way of example only, with reference to the accompanying drawings, in which.

DETAILED DESCRIPTION

Figure 1:
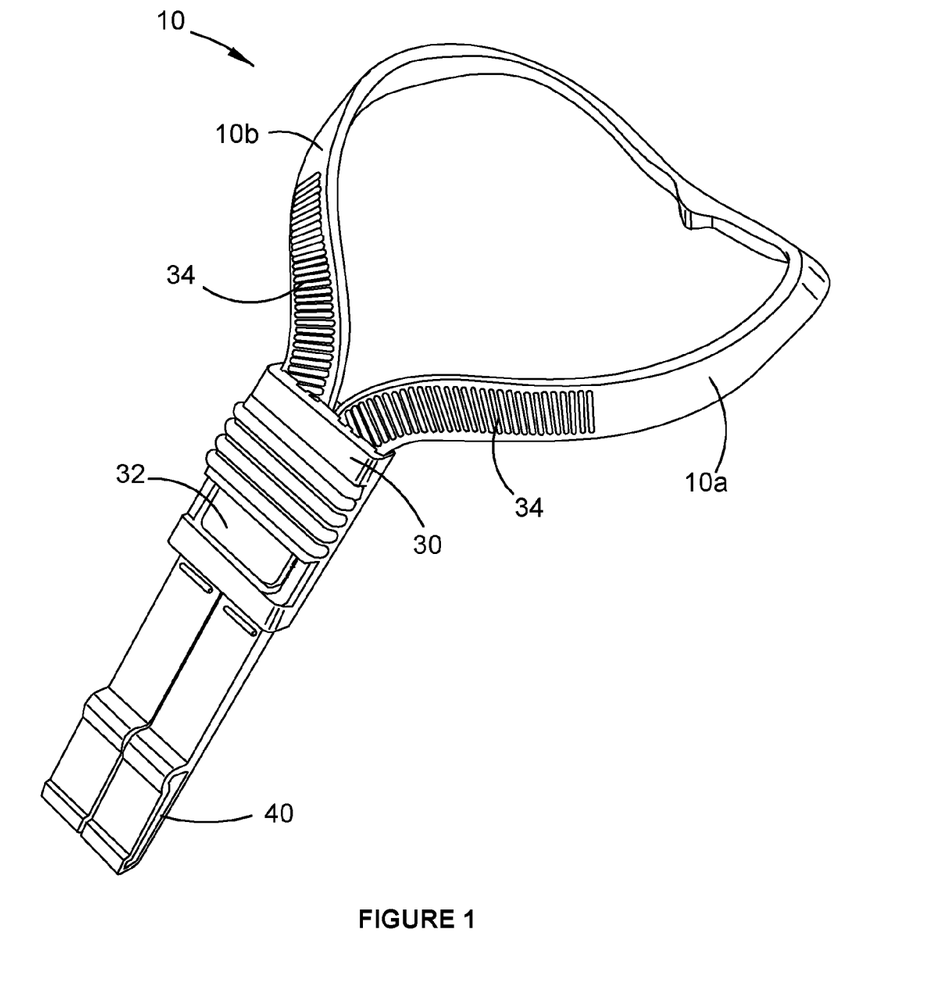
FIG. 1: is a perspective view of a securing strap according to a preferred embodiment of the invention, the strap being configured for use with an equine hoof boot.

A securing strap 10 is shown in FIG. 1. The strap 10 is configured for securing an equine boot to the hoof at a location above a horse's coronary band.

FIGS. 2 to 6 illustrate the strap 10 fitted to a boot 12, the boot 12 being an example of the type of boot to which strap 10 can be fitted. It will be appreciated that the strap 10 can also be fitted to other differently configured boots. Furthermore, although the strap 10 is illustrated as a separate component, in other embodiments the strap may be integrally formed with or secured to the boot, and may be a permanent or temporary fixture.

Figure 2:
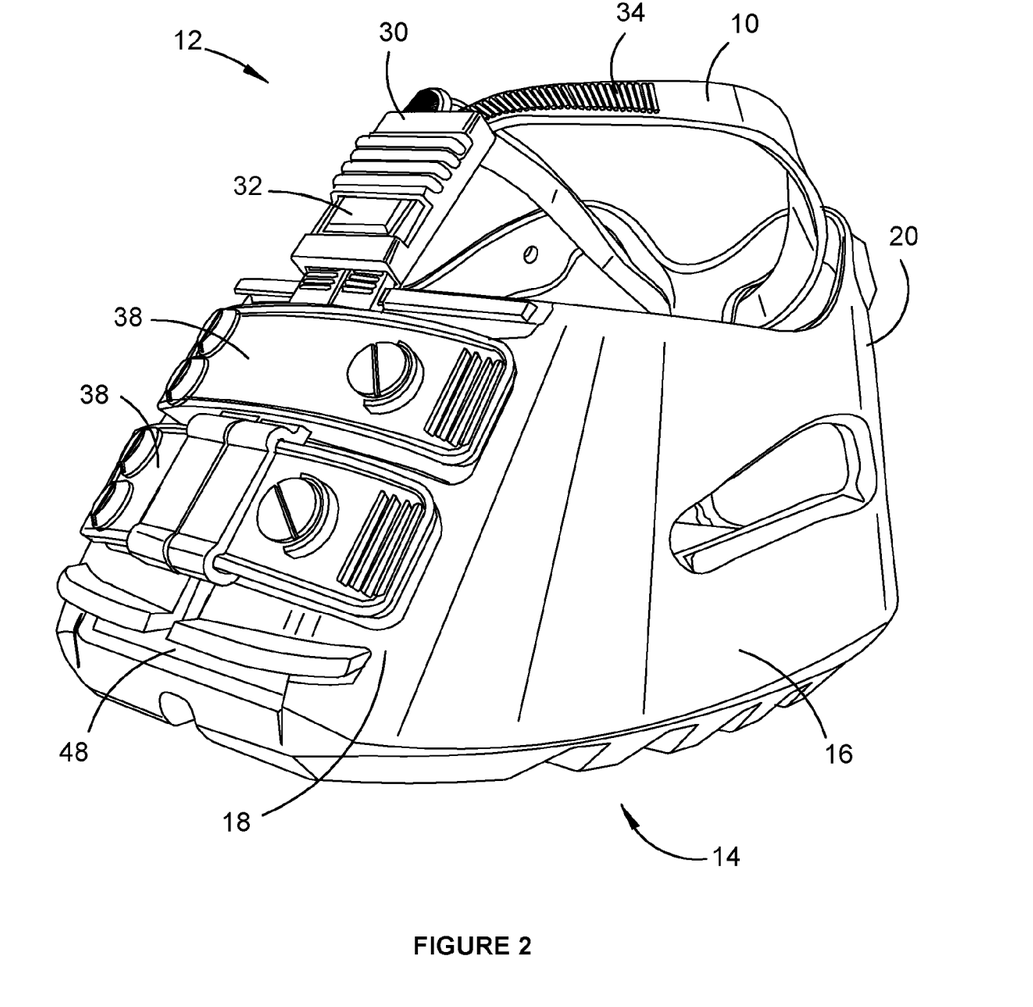
FIG. 2: is a front perspective view of an equine hoof boot according to another embodiment of the invention, the equine boot having the strap of FIG. 1 fitted thereto.

The strap 10 is configured for fixing to the boot 12 at generally central locations (in the middle in other words), with respect to the pastern bone, on the front and rear of the boot. The term generally central is intended to mean in the centre or 20 mm either side of the centre, though it will be appreciated that this dimension may be increased in other less preferably embodiments. It will also be appreciated that the strap may be fixed to an intermediate part of the boot that then connects to a central part of the boot.

Securing the strap to the hoof at central locations provides that forces acting on the boot 12 to dislodge it are transmitted to the horse's hoof at generally central locations to limit rotation and/or leveraging and dislodgement of the boot 12. Advantageously, such an arrangement has been found to significantly improve retention of a boot on a horse's hoof.

The strap 10 has two sections 10a, 10b, each section extending either side of the horse's pastern bone to secure the boot 12 to the hoof. The strap 10 comes close to the pastern bone on both sides and is configured to hug or follow the natural contour of the pastern bone as a relatively tight fit, with only small space, such as a finger or so for example, between the pastern bone and the strap 10.

The two sections 10a, 10b can be branches or segments passing around opposite sides of the hoof. It will be appreciated that the sections may be separate portions of the same part, though in alternative forms the strap may be formed of multiple parts. In an alternative form, sections 10a, 10b may be a removable strap extending around the pastern bone, that may be secured with conventional fastenings such as a buckle or catch.

In the illustrated embodiments, the two sections 10a, 10b come together at a location above the horse's coronary band at a centrally positioned coupler 30 above the front of the boot. In alternative embodiments, the two sections 10a, 10b are joined and become a single piece at the generally central location at the front of the hoof, and secure to the boot at a rear thereof.

The coupler 30 is preferably in the form of a sleeve, though may take other forms such as an adjustable sleeve, lock, clasp or other securement or fastening for keeping the two sections 10a, 10b in position. By keeping the two sections 10a, 10b in position and relatively tight, they act as a bracelet extending partially around the hoof so that movement of the boot 12 downwardly relative to the hoof can be minimised. Once movement of the boot 12 on the hoof occurs, further flexing of the boot 12 can occur, leading to dislodgement.

In alternative embodiments, the coupler could be provided at a rear or side of the hoof, provided that it secures the sections 10a, 10b of the strap in position on the hoof while allowing the sections to be spread apart for fitment to the horse.

In such embodiments, the strap may be a single part securable to the front of the boot 12, with multiple parts securing to a rearward portion of the boot 12, such as at location 25 for example, which is where previous pastern straps have been fitted.

The inventor has determined that for best results, the two sections 10a, 10b should come together and beheld together at a location in a range between the coronary band to a position approximately 40 mm above the coronary band.

In the illustrated embodiments, the coupler 30 has a pawl 32 configured for engagement with teeth 34 formed on the two sections 10a, 10b. In this arrangement, it is believed that the coupler 30 can be adjusted and tightened so that the strap circumscribes the hoof like a band or bracelet. In other embodiments, the coupler 30 may be simple sleeve configured for holding the two sections 10a, 10b together. In such a configuration, a lower part of the coupler 30 may engage an upper part of the boot 12 to hold it in position.

In the illustrated embodiments, the two sections 10a, 10b extend through the coupler 30 for fixing to a forward part of the boot 12 near the sole. It will be appreciated that in other embodiments, the two sections 10a, 10b may secure to the coupler 30, which itself is then coupled to a forward part of the boot 12 near the sole 14, using an extension of the coupler itself or another member.

The two sections 10a, 10b preferably secure to a fastening strap on the front of the boot, though with other boots a different securement method may be used. For example, additional fasteners may be provided on the front of the boot 12 for anchoring the strap 10.

Figure 3:
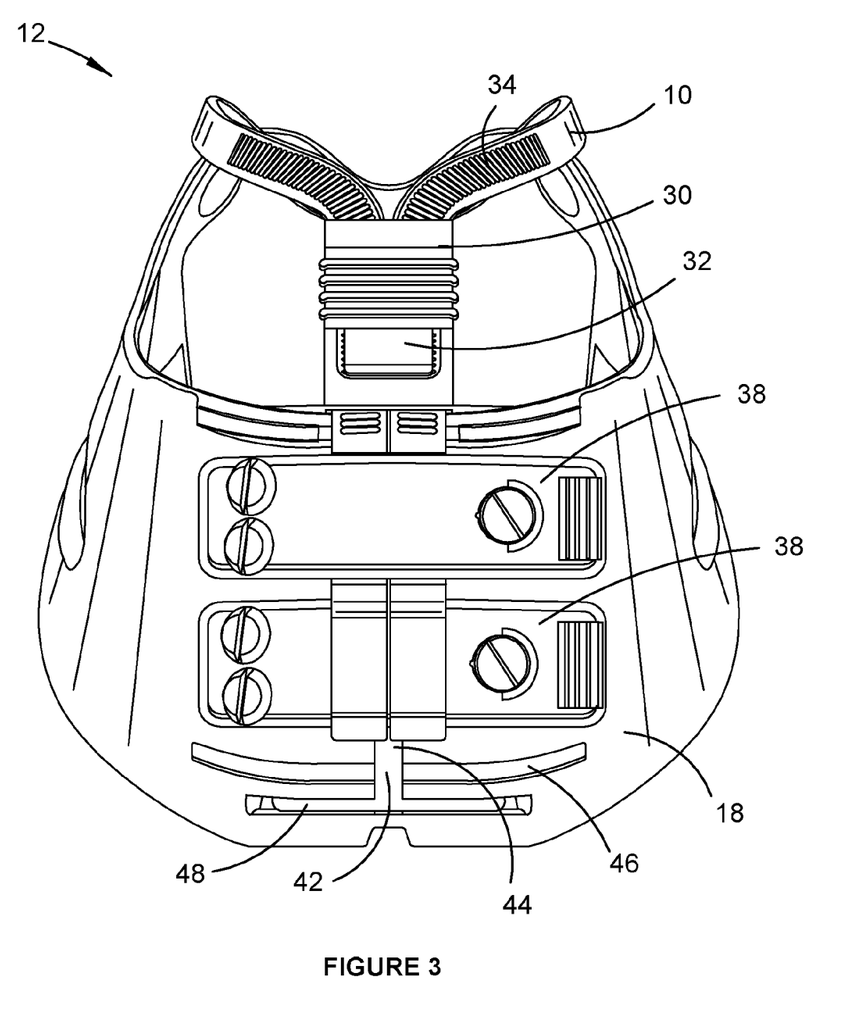
FIG. 3: is a front view of the boot.

In the illustrated embodiments, the boot 12 is formed with a slit 44 formed in a forward section and the boot 12 has at least one fastening strap 38 for closing the slit 44, with the two sections 10a, 10b being securable to the fastening strap. In the illustrated embodiments, the boot 12 comprises two fastening straps 38, the two sections 10a, 10b being secured to a lower one of the fastening straps 38. Each of the strap parts 10a, 10b is formed with an opening 40 at a lower end thereof, through which the lower fastening strap 38 can be received.

In the illustrated embodiments, boot 12 comprises a sole member 14 for receiving against a bottom of a hoof, an upper 16 and a securing strap 10. In use, the boot 12 is opened up, inserted over a hoof of the horse and then fastened in place using straps 38 and securing strap 16.

The upper 16 includes a ventral portion 18 at a front of the boot and a dorsal portion 20 at a rear of the boot. In use, an inside of the ventral portion 18 is contactable with a toe of the hoof and an inside of the dorsal portion 20 is contactable with a side and rear of the hoof. The dorsal portion 20 includes bulb-engaging means 22 (see FIG. 4) for engaging peripheries of bulbs of the hoof so as to impede rotation of the boot relative to the hoof.

Figure 4:
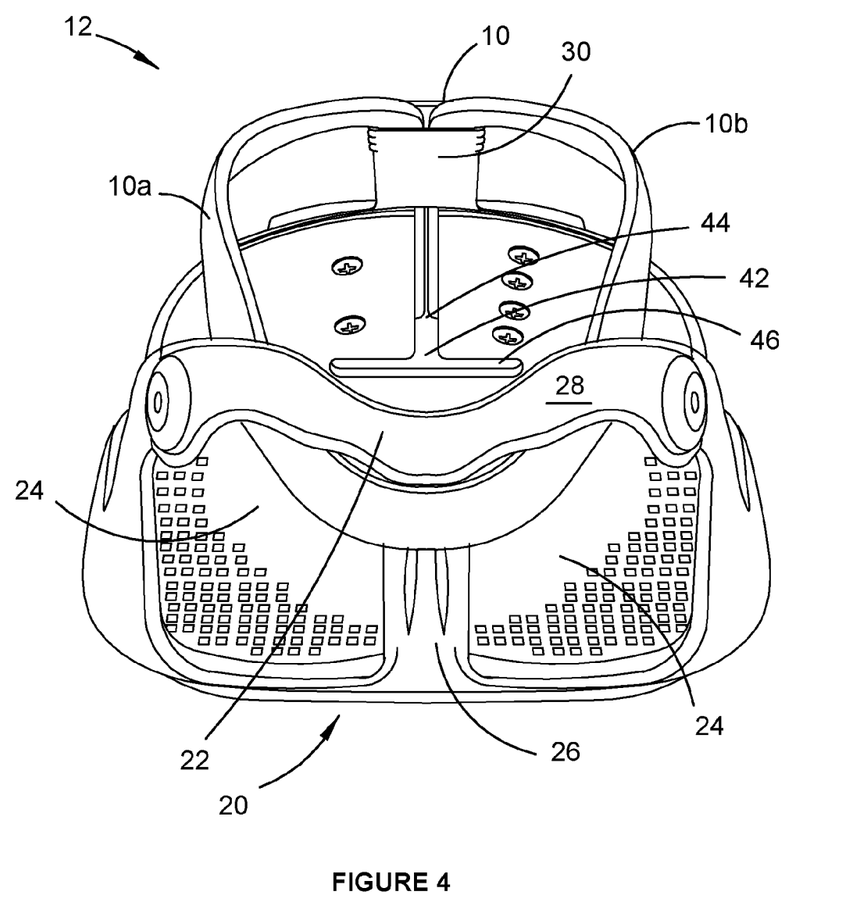
FIG. 4: is a rear view of the boot.
Figure 5:
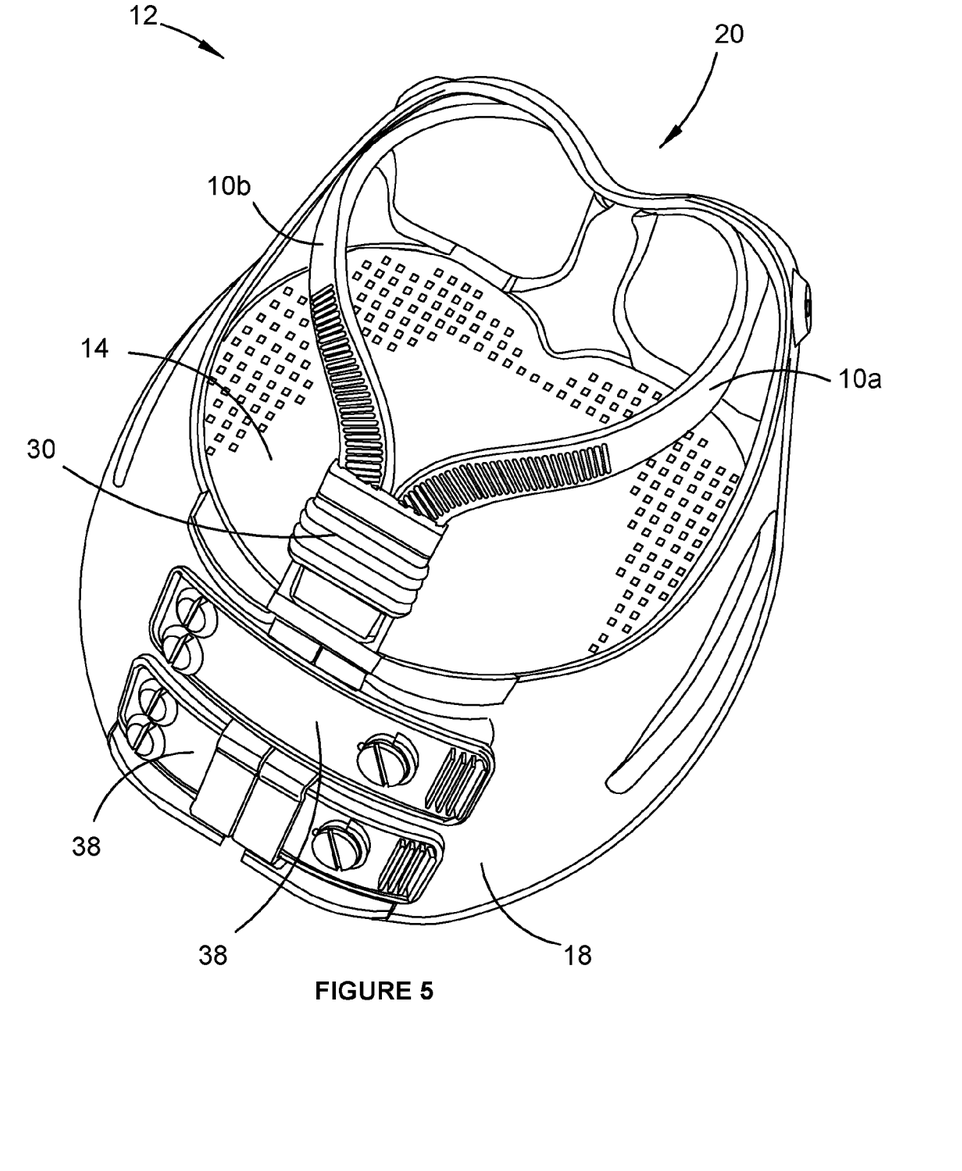
FIG. 5: is an upper perspective view of the boot.
Figure 6:
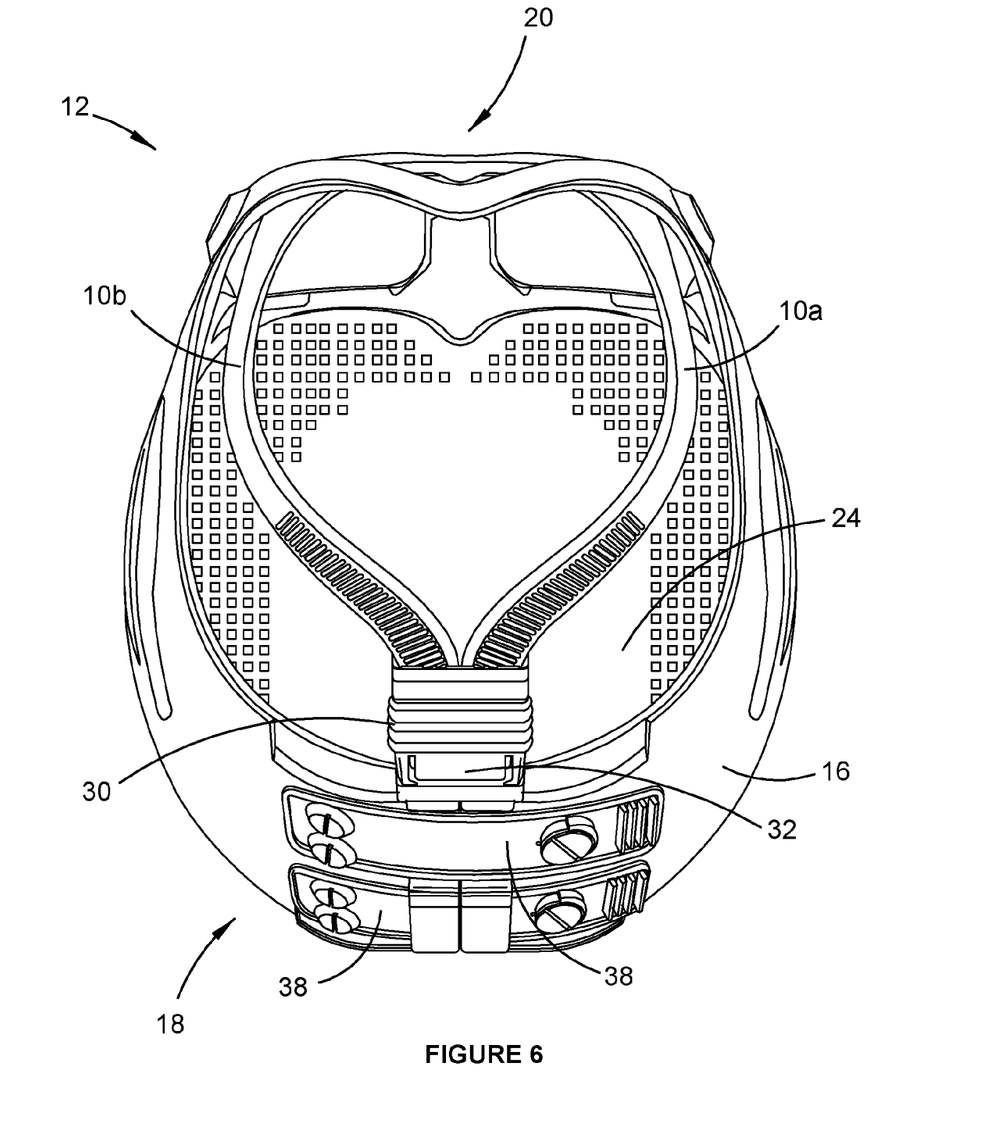
FIG. 6: is a plan view of the boot

The bulb engaging means 22 are formed around aperture 24, which is formed between the upper 16, vertical extension 26 and lateral member 28. The bulb engaging means 22 take a generally 'm' shaped form. Through apertures 24 respective bulbs of the hoof can protrude when the boot is worn. In preferred embodiments, the apertures extend to the level of the interior of the sole member.

The ventral portion 18 has an opening 42 extending therethrough to a level of the interior of the sole member 14 so as to allow the ventral portion 18 to be spread open for application of the boot 12 to the hoof. The opening 42 comprises a substantially vertical slit 44. The opening 42 also comprises a lateral opening 48 extending through a lower end of the upper 16 which opens up to the level of the interior of the sole member 14. The vertical slit 44 and the lateral opening 48 together define an upside-down t-shaped opening in the ventral portion 18. Above lateral opening 48 is a protective bar or bumper 46 that forms a ledge above the opening 48.

As can be seen in FIG. 4, the dorsal portion 20 takes a substantially 'm' shaped configuration and the securing strap 10 engages an upper central part of the 'm'. In this regard, the securing strap 10 extends through apertures 24 formed in the bulb engaging means by passing through one and out the other, and around a generally vertical part of the 'm' 26 which is a portion that extends between the bulbs. This allows the strap 10 to engage the boot at a location on top of the bulbs of the hoof.

In the illustrated embodiment, the strap 10 runs flat over a top of the bulbs, actually laying on top of the bulbs. This reduces or avoids irritation to the hoof. Were the strap to be positioned any higher on the hoof it could interfere with the leg. Were the strap to be positioned any lower it would interfere with the bulbs.

It will be appreciated that there are many other ways in which the securing strap 10 may engage the dorsal portion 20, particularly for boots of other configurations, though the illustrated retention method has been found to be easily constructed, simple and effective.

For example, the strap 10 may simply secure to fasteners secured to the dorsal portion at sides of the 'm', or to a side or rear of the boot, preferably near an upper part of the boot.

The bulb-engaging means includes a cleft-engaging member 26 for engaging a cleft of the bulbs of the hoof. The cleft-engaging member 26 includes a shank or web which engages the cleft of the bulbs. The shank or web is generally half round in cross section, the rounded surface of the shank or web being directed towards the cleft when the boot is worn.

In use, strap 10 is unsecured and fastening straps 38 are opened to allow the boot 12 to be fitted to the hoof. Once the boot 12 is placed over the hoof, the two sections 10a, 10b are then passed around the opposite sides of the hoof one either side of the pastern bone and above the coronary band. Ends of the two sections 10a, 10b are then fed through coupler 30 and drawn tight around the hoof.

Ends of the two sections 10a, 10b are then slid over the lowermost fastening strap 38, the lowermost fastening strap 38 being received through openings 40. Once the ends of the two sections 10a, 10b are secured to the lowermost fastening strap 38, that fastening strap is secured to the boot 12, along with the uppermost fastening strap 38. After a quick fitment check, the boot is ready for use.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A securing strap for an equine hoof boot having an upper including a dorsal portion with apertures for receiving respective bulbs of the hoof, the apertures being formed between the upper, a vertical extension of the dorsal portion for engaging a cleft between the bulbs, and a lateral member of the dorsal portion configured to engage an upper periphery of the bulbs, the strap being configured for securing the boot to a hoof of a horse at a location above the horse's coronary band and for fixing to the boot at generally central locations on a front and rear of the boot, wherein the strap comprises:
an adjustable sleeve which, in use is positioned above a front of the boot; and
first and second sections, each configured to extend forwardly from the dorsal portion and on either side of the horse's pastern bone to come together at the location above the horse's coronary band at the adjustable sleeve, wherein the adjustable sleeve brings the first and the second sections into a substantially parallel alignment in relation to each other, and
wherein respective ends of the first and second sections are fed downwardly through the adjustable sleeve for fixing to the front of the boot near a sole thereof such that the securing strap is able to be drawn tight around the hoof,
wherein the strap forms a loop that extends from an upper end of the adjustable sleeve and that is configured to pass in one of the apertures, around the vertical extension and under the lateral member, and out the other of the apertures so as to be secured to the dorsal portion of the boot, and wherein the respective ends of first and second sections each have a lateral opening passing therethrough, and the lateral openings are aligned with one another in the substantially parallel alignment such that a fastening strap can pass through both lateral openings at the respective ends of the first and second sections.

2. The securing strap according to claim 1, wherein the first and second sections and the adjustable sleeve are positioned relative to one another such that, in use, the first and second sections come together at a location approximately 40 mm above the coronary band.

3. The securing strap according to claim 1, wherein the strap is configured to be secured to fasteners secured to a dorsal portion of the boot.

4. The securing strap according to claim 1, wherein a lower portion of the adjustable sleeve is configured to engage the boot to keep the boot in position.

5. The securing strap according to claim 1, wherein the first and the second sections of the strap when brought together by the adjustable sleeve are substantially perpendicular in relation to the horse's coronary band.

6. The securing strap according to claim 1, wherein:
the first and second sections comprise teeth where the first and second sections are fed through the adjustable sleeve, and
the adjustable sleeve has a pawl which engages the teeth.

7. An equine boot comprising:
a securing strap;
a sole member for receiving against a bottom of a hoof;
an upper having a ventral portion at a front of the boot and a dorsal portion at a rear of the boot, wherein an inside of the ventral portion is contactable with a toe of the hoof and an inside of the dorsal portion is contactable with a rear of the hoof, the dorsal portion including bulb-engaging elements for engaging peripheries of bulbs of the hoof so as to impede rotation of the boot relative to the hoof, the bulb engaging elements including apertures for receiving respective bulbs of the hoof, the apertures being formed between the upper, a vertical extension of the dorsal portion for engaging a cleft between the bulbs, a lateral member of the dorsal portion configured to engage an upper periphery of the bulbs, and the securing strap; and a fastening strap at the ventral portion,
wherein the securing strap extends between the ventral and dorsal portions to secure the boot to the hoof at a location above a horse's coronary band and for fixing to the boot at generally central locations on the front and rear of the boot, the securing strap forming a loop passing in one of the apertures, around the vertical extension and under the lateral member, and out the other of the apertures so as to be secured to the dorsal portion of the boot, and wherein the securing strap comprises:

an adjustable sleeve which is positioned above the front of the boot; and first and second sections, each of the first and second sections configured to extend forwardly from the dorsal portion and on either side of the horse's pastern bone and to come together at the location above the horse's coronary band at the adjustable sleeve, wherein the adjustable sleeve brings the first and the second sections into a substantially parallel alignment in relation to each other, and wherein respective ends of the first and second sections are fed downwardly through the adjustable sleeve and fixed to the front of the boot near the sole member such that the securing strap is able to be drawn tight around the hoof, and wherein the respective ends of first and second sections each have a lateral opening passing therethrough, and the lateral openings are aligned with one another in the substantially parallel alignment such that the fastening strap can pass through both lateral openings at the respective ends of the first and second sections.

8. The equine boot according to claim 7, wherein the dorsal portion takes a substantially 'm' shaped configuration and the securing strap engages an upper central part of the 'm'.

9. The equine boot according to claim 8, wherein the securing strap extends around a generally vertical part of the 'm', through the apertures of the bulb engaging elements.

10. The equine boot according to claim 7, wherein the ventral portion has an opening extending therethrough to a level of an interior of the sole member so as to allow the ventral portion to be spread open for application of the boot to the hoof.

11. The equine boot according to claim 10, wherein the opening comprises a substantially vertical slit.

12. The equine boot according to claim 11, further comprising a lateral opening extending through a lower end of the upper which opens up to the level of the interior of the sole member.

13. The equine boot according to claim 12, wherein the vertical slit and the lateral opening together define an upside down t-shaped opening in the ventral portion.

14. The equine boot according to claim 10, wherein: the fastening strap extends laterally, from one side of the opening in the ventral portion to another side of the opening in the ventral portion.

15. The equine boot according to claim 7, wherein the first and the second sections of the strap when brought together by the adjustable sleeve are substantially perpendicular in relation to the horse's coronary band.

16. The equine boot according to claim 7, wherein in use the adjustable sleeve overlies the horse's coronary band.

17. The equine boot according to claim 7, wherein:

the first and second sections comprise teeth where the first and second sections are fed through the adjustable sleeve, and the adjustable sleeve has a pawl which engages the teeth.

* * * * *